(12) United States Patent
A/L Lynkaran et al.

(10) Patent No.: US 7,980,337 B2
(45) Date of Patent: Jul. 19, 2011

(54) STAIR CLIMBING DEVICE

(75) Inventors: Kannappan@Suresh A/L Lynkaran, Singapore (SG); Chin Sai Wong, Singapore (SG)

(73) Assignee: Nanyang Polytechnic, Singapore (SG)

( * ) Notice: Subject to any disclaimer, the term of this patent is extended or adjusted under 35 U.S.C. 154(b) by 73 days.

(21) Appl. No.: 12/531,491

(22) PCT Filed: Mar. 16, 2007

(86) PCT No.: PCT/SG2007/000075
§ 371 (c)(1),
(2), (4) Date: Sep. 16, 2009

(87) PCT Pub. No.: WO2008/115145
PCT Pub. Date: Sep. 25, 2008

(65) Prior Publication Data
US 2010/0108412 A1    May 6, 2010

(51) Int. Cl.
*B62B 5/02* (2006.01)
(52) U.S. Cl. ........................ 180/9.22; 180/8.1
(58) Field of Classification Search .................. 180/9.22, 180/8.1, 8.2, 8.7
See application file for complete search history.

(56) References Cited

U.S. PATENT DOCUMENTS

| | | | | |
|---|---|---|---|---|
| 2,928,501 A * | 3/1960 | Ramirez | ....................... | 187/244 |
| 3,713,501 A * | 1/1973 | Hurt | ............................. | 180/9.22 |
| 4,027,889 A * | 6/1977 | Krofchalk et al. | ........... | 280/5.22 |
| 4,645,022 A * | 2/1987 | Bergquist | ...................... | 180/6.7 |
| 4,747,457 A * | 5/1988 | Buscaiolo et al. | ........... | 180/19.1 |
| 6,155,362 A * | 12/2000 | Owens | ......................... | 180/9.22 |
| 7,779,940 B2 * | 8/2010 | Demetrulias | ................. | 180/9.23 |
| 2004/0094378 A1 * | 5/2004 | Gandy | ......................... | 190/18 A |

FOREIGN PATENT DOCUMENTS

| | | | |
|---|---|---|---|
| FR | 2659285 A | | 9/1991 |
| JP | 2001315646 A | | 11/2001 |

* cited by examiner

*Primary Examiner* — Joanne Silbermann
*Assistant Examiner* — Michael R Stabley
(74) *Attorney, Agent, or Firm* — Pyprus Pte Ltd (57) ABSTRACT

The present invention provides a device for safely and conveniently conveying an object on a slope. The safety feature includes a fail-safe one-way brake comprising a ratchet wheel, a pawl and a biasing means. In one embodiment, the device is foldable; in another embodiment, the device is integrated with a suitcase; in yet another embodiment, the device is motorized.

22 Claims, 8 Drawing Sheets

STAIR CLIMBING DEVICE

FIELD OF INVENTION

The present invention relates to a device for conveying an object on an uneven slope, in particular a staircase.

BACKGROUND

There are situations where people need to convey heavy or bulky objects, e.g. suitcases, up or down uneven slopes, such as staircases when no elevator is available. Dragging such heavy objects up or down a flight of stairs can be very difficult.

Conventional suitcases usually have wheels on the bottom to ease the movement of the suitcase on a flat surface. However, such configured wheels are not suitable for manoeuvring the suitcases over the edges of staircases.

U.S. Pat. No. 6,938,740 discloses a suitcase that has a plurality of rollers mounted on the back panel of the suitcase to assist in pulling the suitcase up a staircase and a handbrake to stop the movement of the suitcase on the stairs by frictionally engaging brake pads with the rollers. However, this disclosed suitcase has certain disadvantages. Firstly, the friction brake is not consistently reliable, due to wear and tear of the brake pads. Secondly, the brake is ineffective when the suitcase is out of the reach of a user. Accidental release of such a suitcase at an upper staircase would endanger the lives of people who happen to be in the way of the suitcase rolling down the staircase.

Therefore, there is an imperative need for a device for conveying, objects on uneven slopes conveniently and safely.

SUMMARY

The present invention provides a device for conveying an object on a surface, which comprises a support having a open chamber facing the surface; and a climbing module housed in the chamber, the module comprising a pair of pulleys operable to rotate about parallel axes; a belt circumscribing the pair of pulleys and operable to turn in cooperation with the pair of pulleys in a first direction or in a second direction opposite to the first direction; a one-way brake for engaging with one of the pulleys and preventing the belt from turning in the first direction but not in the second direction; and a wire having a first end and a second end, the first end of the wire being connected to the one-way brake; wherein a pulling force on the wire disengages the one-way brake so that the belt is operable to turn in either direction and the device can be moved by the belt on the surface.

In accordance with one embodiment of the present invention, the one-way brake comprises a ratchet wheel secured on the pulley that is engaged by the one-way brake; a pawl for engaging with the ratchet wheel in a resting position so as to prevent the belt from turning in the first direction; and a biasing means for creating a biasing force to lock the pawl in the resting position so that the one-way brake is engaged; wherein the one-way brake is disengaged only when the pulling force on the wire overcomes the biasing force and moves the pawl away from the resting position.

In accordance with another embodiment of the present invention, when the device is operated by a user to convey an object on an uneven slope, such as a staircase, the belt turning in cooperation with the pair of pulleys eases the movement of the object on the slope and the one-way brake is configured to be engaged immediately to stop the device from moving down the slope, once the user accidentally loses the control of the device.

The objectives and advantages of the present invention will become apparent from the following detailed description of embodiments thereof in connection with the accompanying drawings.

BRIEF DESCRIPTION OF THE DRAWINGS

The present invention will now be described with reference to the accompanying drawings, in which like reference numerals denote like elements.

DETAILED DESCRIPTION

The present invention may be understood more readily by reference to the following detailed description of certain embodiments of the invention. However, it will be understood by those skilled in the relevant art that the present invention may be practised without these specific details. In other instances, well-known methods, procedures, and components have not been described in detail so as not to obscure the present invention.

Figure 1:
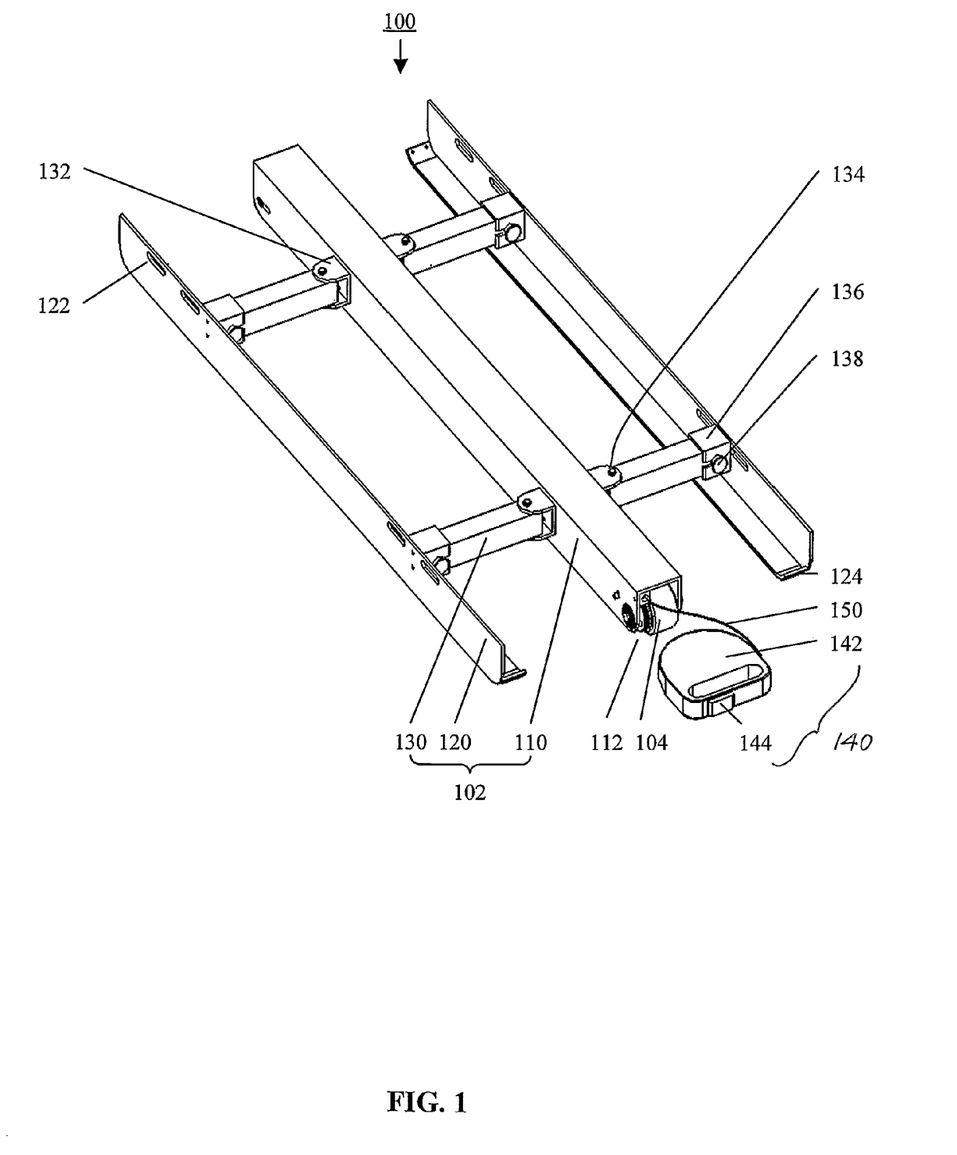
FIG. 1 shows a perspective view of a stair climbing device in accordance with one embodiment of the present invention.

FIG. 1 shows a perspective view of a stair climbing device 100 in accordance with one embodiment of the present invention. The stair climbing device 100 comprises a support 102 for loading and supporting an object (not shown in FIG. 1); a climbing module 104 connected to the support for conveying the object; a handle 140 for steering the device 100 to a desired direction; and a wire 150 for connecting the handle 140 to the climbing module 104.

Still referring to FIG. 1, the support 102 comprises a supporting beam 110 that serves as a mounting frame for the climbing module 104; and a sledge beam 120 that is positioned in parallel at each of the two sides of the supporting beam 110. Upper surfaces of the supporting beam 110 and the sledge beams 120 form a flat platform for supporting the object. The supporting beam 110 defines a hollow chamber 112 open at a ground surface for housing the climbing module 104.

In one embodiment of the supporting beam, the supporting beam 110 is U shaped.

In one embodiment of the sledge beam, the sledge beam 120 is L shaped. The horizontal leg of each L shaped sledge beam 120 forms part of a planar contact surface between the device 100 and stairs (not shown in FIG. 1). In addition, a plurality of slots 122 are carved on the vertical leg of each L shaped sledge beam 120. These slots 122 are useful as anchor points for luggage straps, strings, ropes or hooks for fastening the object to the support 102.

In one embodiment of the sledge beam, each sledge beam 120 is coated with a layer of low friction material, such as polytretrafluoro-ethylene (PTFE), on the surface 124 in contact with stairs in order to reduce sliding friction. In another embodiment, the low friction material is high-density polyethylene (HDPE).

In yet another embodiment, the low-friction contact surface is provided by attaching a strip of low friction material to the surface 124.

Still referring to FIG. 1, the support 102 can be assembled in a collapsible way. Each sledge beam 120 is connected to a side of the supporting beam 110 by two bars 130. One end of each bar 130 is connected to the supporting beam 110 by a bracket 132 and a pin 134, such that each bar 130 is pivoted and foldable to a side of the supporting beam 110. The other end of each bar 130 is connected to the sledge beam 120 by a socket 136; this end of the bar 130 is kickable in the socket 136 by a spring loaded locking pin 138. To disassemble the support 102, the spring loaded locking pins 138 are partially displaced so that the end of the bars 130 can be dislodged from the sockets 136. In another embodiment of the support, one end of the bar 130 is pivoted at the sledge beam 120 whilst the other end is connected to the supporting beam 110 by a socket joint.

In another embodiment of the support, the bars 130 form members of a scissor arm mechanism. The scissor arm mechanism allows the supporting beam 110 and the sledge beams 120 to be connected in a collapsible manner. In yet other embodiment of the support, the sledge beams 120 are connected to the supporting beam 110 by two-position hinges.

In one embodiment of the support, pockets are carved in the supporting beam 110 as well as slots in the sledge beams 120 and the bars 130 to reduce the weight of the stair climbing device 100 for convenient carriage.

Still referring to FIG. 1, the handle 140 comprises a housing 142 for holding a part of the wire 150 within and a release 144 for releasing the wire 150 disposed within the housing 142 so that the length of the wire 150 between the handle 140 and the climbing module 104 can be adjusted in order to cater for individual use. The wire 150 is spring-loaded (not shown in FIG. 1) in the housing 142. When the release 144 is pressed, the wire 150 will be recoiled. When the release 144 is pressed and a pulling force is exerted on the wire 150, part of the wire 150 disposed within the housing 142 will be released.

Figure 2A:
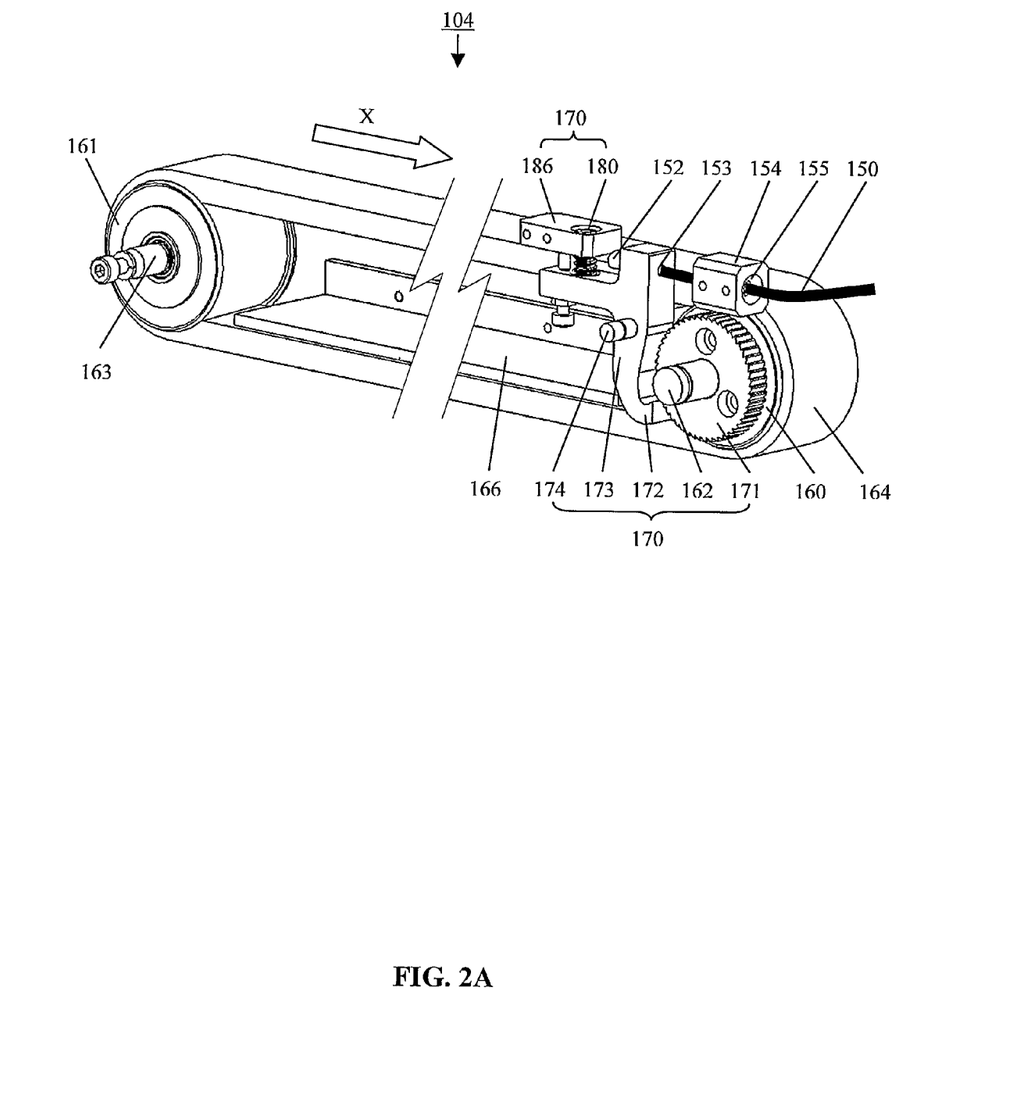
FIG. 2A shows a perspective view of the climbing module of the stair climbing device shown in FIG. 1; whilst

FIG. 2A shows a perspective view of the climbing module 104 of the stair climbing device shown in FIG. 1 according to one embodiment of the present invention. The climbing module 104 comprises a front pulley 160, a rear pulley 161, an endless belt 164 and a one-way brake 170 for blocking the movement of the climbing module 104 in a direction opposite to X direction indicated by the arrow as seen in FIG. 2A, when the brake is engaged.

Still referring to'FIG. 2A, the two pulleys 160, 161 are mounted in the supporting beam 110 (not shown in FIG. 2A) and operable to rotate about two parallel pivots 162, 163. Part of each pulley 160, 161 extends below a lower surface of the supporting beam 110. The interior surface of the belt 164 circumscribes the two pulleys 160, 161, so that the belt 164 is operable to turn in cooperation with the two freewheeling pulleys 160, 161. The exterior surface of the belt 164 that extends below the lower surface of the supporting beam 110, together with lower parts of the sledge beams 120 (not shown in FIG. 2A), forms a planar contact surface with stairs (not shown in FIG. 2A), acting as a traction surface on which the device 100 travels. In addition, a support member 166 is mounted above the lower part of the belt 164 for preventing the belt 164 from bending inward and maintaining the planar contact surface with stairs.

In one embodiment of the support member, the support member 166 is L shaped. In another embodiment of the support member, the support member 166 is coated with a layer of low friction material, such as PTFE, on the surface 167 (not shown in FIG. 2A) in contact with the belt 164, in order to reduce sliding friction. In yet another embodiment of the support member, the low friction material for coating the surface 167 is HDPE.

In one embodiment of the climbing module 104, the pulleys 160, 161 are timing pulleys; accordingly, the endless belt 164 is a timing belt that matches the timing pulleys 160, 161. In one embodiment of the timing belt 164, the exterior surface of the belt 164 has a rubberized coating to enhance traction between the belt 164 and the surface in contact.

Figure 2B:
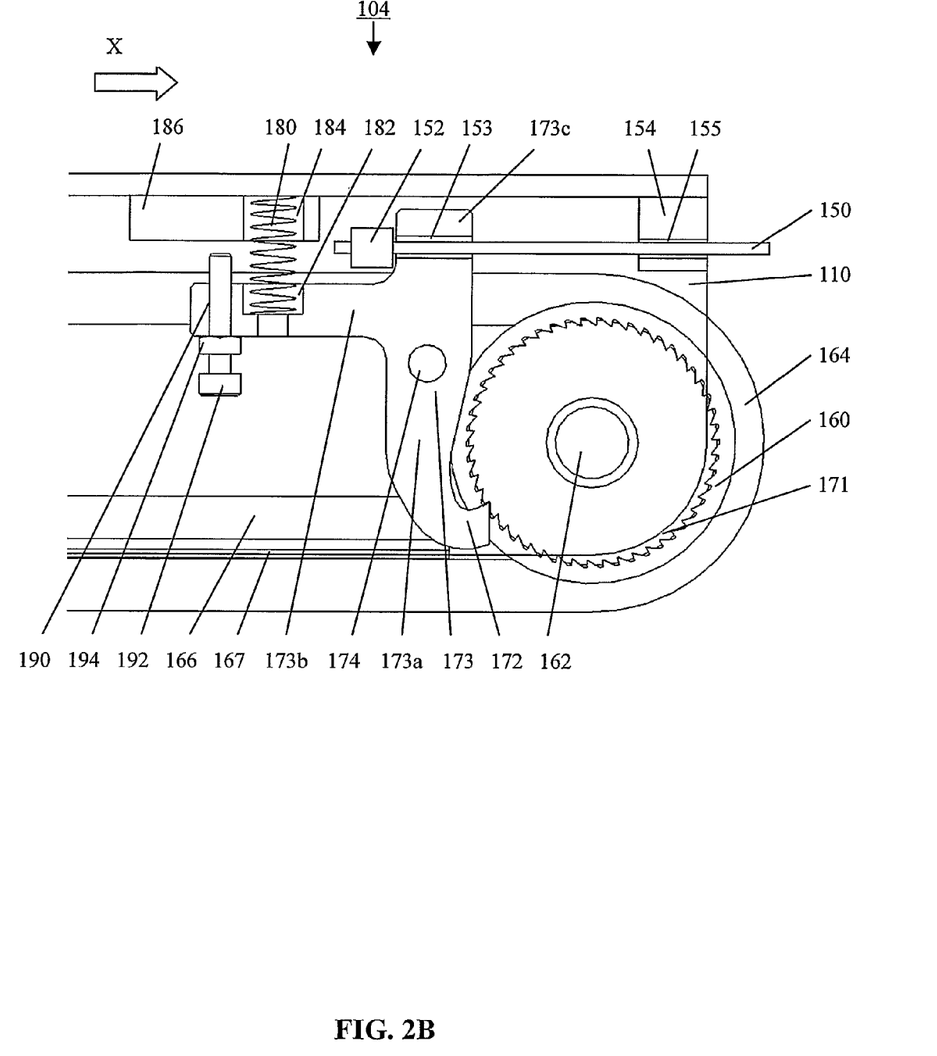
FIG. 2B shows an enlarged cross sectional view of part of the climbing module shown in FIG. 2A.

FIG. 2B illustrates a cross sectional view of part of the climbing module 104 shown in FIG. 2A. The one-way brake 170 (also shown in FIG. 2A) comprises a ratchet wheel 171, a pawl 172 for engaging with the ratchet wheel in a resting position, and a biasing means 180 for biasing the pawl 172 towards the resting position. The ratchet wheel 171 is mounted co-axially on a side of the front pulley 160 with teeth of the ratchet wheel 171 pointing in the anti-clockwise direction as seen in FIG. 2B. The pawl 172 is located at one end of a lever 173 rotatable about an axis 174 parallel to the axis 162. The lever 173 has three arms: a pawl arm 173a, a stopper arm 173b and an actuator aim 173c. The pawl arm 173a terminates with the pawl 172, which is operable to engage with teeth of the ratchet wheel 171 to prevent anti-clockwise rotation of the front pulley 160 as seen in FIG. 2B, but allowing clockwise rotation. The engagement of the pawl 172 with the ratchet wheel 171 defines the resting positions for the pawl 172 and the lever 173.

Still referring to FIG. 2B, one end of the biasing means 180 is located in a recess 182 of the stopper arm 173b. The other end of the biasing means 180 contiguous with the supporting beam 110 is located in an aperture 184 in a locating plate 186. When assembled, the aperture 184 is in line with the recess 182 on the stopper arm 173b, such that the recess 182, the aperture 184 and the supporting beam 110 keep the biasing means 180 in position. The biasing means 180 creates a torque in the anti-clockwise direction as seen in FIG. 2 on the lever 173 so that the pawl 172 is urged towards the resting position to engage with teeth of the ratchet wheel 171. In this way, the one-way brake is engaged by default, wherein the belt 164 can only turn in the clockwise direction and the climbing module 104 can only move in X direction.

In one embodiment of the biasing means as shown in FIG. 2B, the biasing means 180 is a compression spring. In another embodiment, the biasing means 180 is a biasing block, such as a rubber rod. In yet another embodiment, the biasing means 180 is a stack of disc springs. In another further embodiment, the biasing means 180 is a fluid shock-absorber. In yet another embodiment, the biasing means 180 is a tension spring; for example, one end of the tension spring is attached to the stopper arm 173b whist the other end is attached to the supporter member 166.

Still referring to FIG. 2B, the stopper arm 173b has an additional threaded hole 190 near the recess 182. A screw 192 is provided in the threaded hole 190. The length of the screw 192 extending from the stopper arm 173b towards the locating plate 186 is adjustable. Once the screw 192 length is set, the screw 192 is lockable by a lock nut 194. The screw 192 acts as a stopper when the lever 173 rotates in a clockwise direction as seen in FIG. 2B, and the biasing means 180 is compressed.

Still referring to FIG. 2B, one end of the wire 150 is attached to the actuator arm 173c of the lever 173. The attachment is formed by threading the wire 150 through a bore 153 through the actuator arm 173c and crimping a sleeve 152 that is larger than the bore 153 at one end of the wire 150. An additional wire guide 154 with another bore 155 is provided on the front end of the supporting beam 110. The other end of the wire 150, passed through the bore 155, is disposed in the housing 142 of the handle 140.

In accordance with another embodiment of the present invention, the wire 150 is connected to the actuator arm 173c by means of a threaded hole on the bore through the arm 173c and a screw in the threaded hole tightened on the wire against the bore. In yet another embodiment, the wire through the arm 173c and additional guide 154 is a bar that is rigid but terminates with an attachment for a wire 150.

Now referring again to FIG. 2A, when a pulling force, in X direction as seen in FIG. 2, is exerted on the wire 150, it generates a torque on the lever 173 in the clockwise direction. When the torque generated by the pulling force on the lever 173 is greater than the opposing torque generated by the biasing means 180, the lever 173 will rotate in the clockwise direction, thereby moving the pawl 172 away from the resting position and releasing the ratchet wheel 171. In this way, the one-way brake is disengaged; wherein the belt 164 is operable to turn in either clockwise or anti-clockwise direction, and the climbing module is movable in either X direction or the opposite direction.

Figure 3:
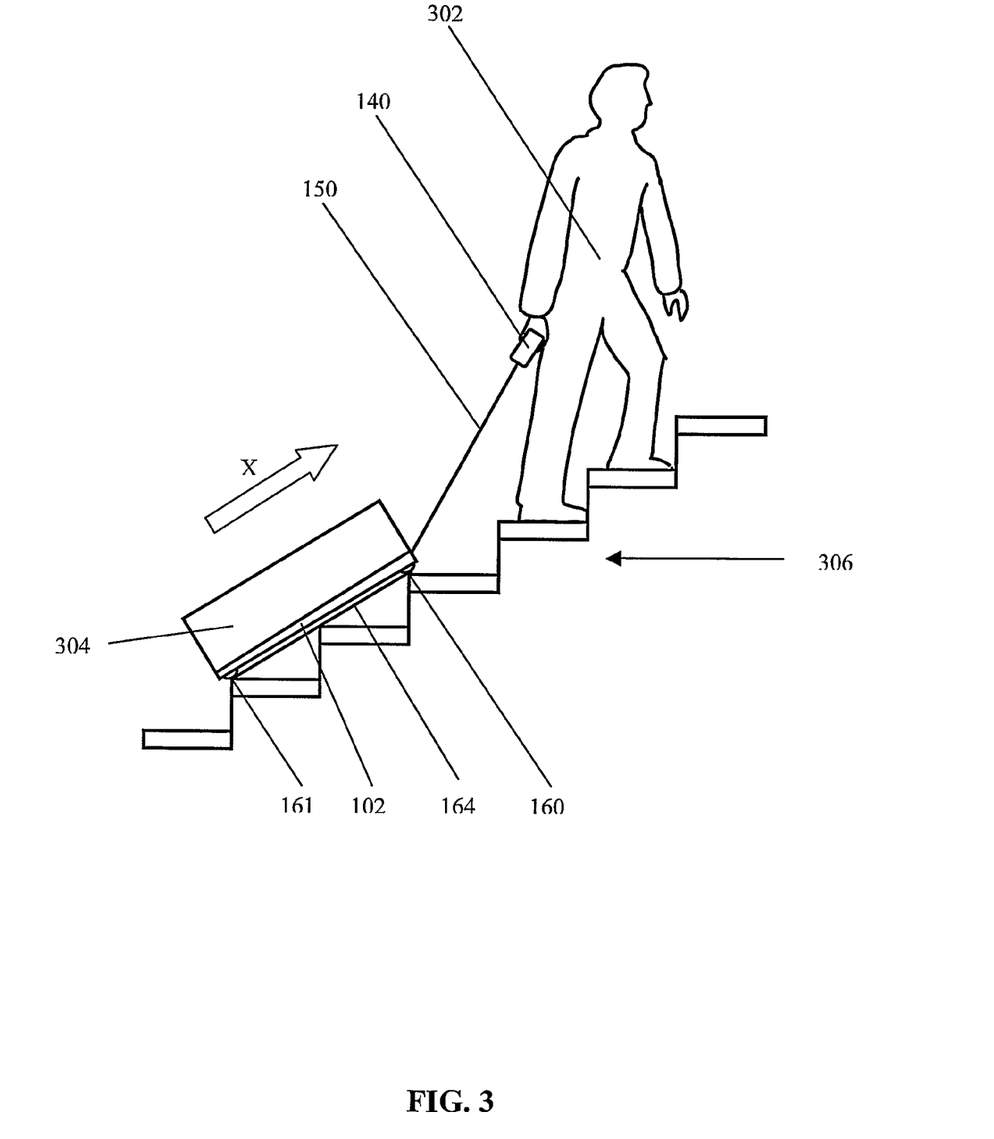
FIG. 3 shows a stair climbing device in accordance with another embodiment of the present invention, in operation to convey an object on an uneven slope.

FIG. 3 shows a side view of a stair climbing device 100 in accordance with one embodiment of the present invention, in operation by a user 302 to convey an object 304 on a staircase 306. The object 304 is strapped on the top of the supporter 102. The user 302 pulls on the handle 140, moving the pawl 172 away from the resting position and disengaging the one-way brake. The movement direction of the device 100 on the staircase 306 will be determined by the combination effect of the pulling force, the gravity force and the rolling friction force between the belt 164 and stairs 306. When along the X-axis as seen in FIG. 3 the pulling force is greater than the gravity force plus the rolling friction force, the belt 164 will turn in the clockwise direction, so that the climbing module 100 will move upstairs. When along the X-axis the pulling force is less than the gravity force minus the rolling friction force, the belt 164 will turn in the anticlockwise direction, so that the climbing module 100 will move downstairs. When the pulling force is removed, the pawl 172 will immediately snap back to the resting position under the torque generated by the biasing means 180 and stop the belt 164 from turning in the anti-clockwise direction, thereby preventing the device 100 from moving downstairs.

In one embodiment of the device 100, the front 160 and rear 161 pulleys are spaced apart such that they span a distance between edges of at least two steps of a typical staircase.

Figure 4:
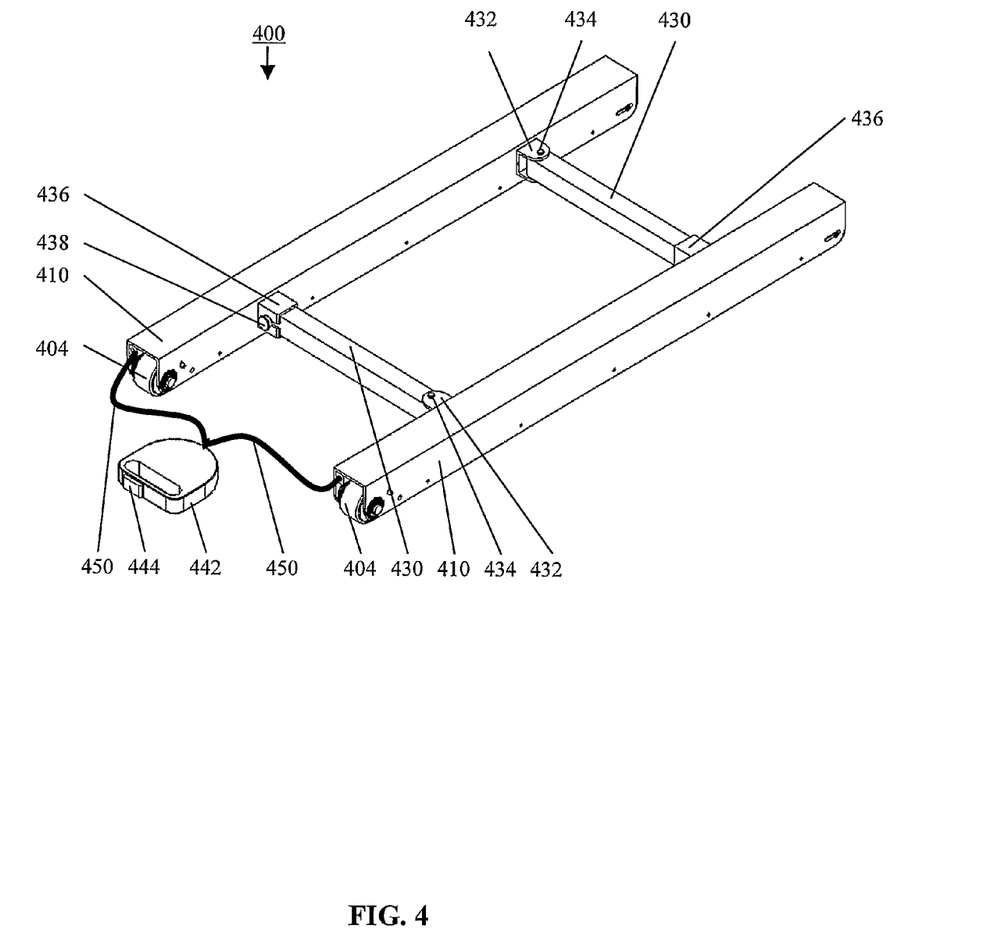
FIG. 4 shows a perspective view of a stair climbing device in accordance with another embodiment of the present invention.

FIG. 4 shows a perspective view of a stair climbing device 400 in accordance to another embodiment of the present invention. The stair climbing device 400 comprises two climbing modules 404. Each climbing module 404 is configured in a similar manner as the climbing module 104 of the earlier embodiment. However, the two climbing modules 404 are positioned in parallel and connected by two bars 430. Each bar 430 is configured similar to the bar 130 in the earlier embodiment. One end of the bar 430 is pivotable with one climbing module 404 and the other end is detachably connected to the other climbing module 404 by a socket 436 lockable by a spring loaded locking pin 438. The two wires 450 are housed in a same handle 440 and controlled simultaneously.

Figure 5:
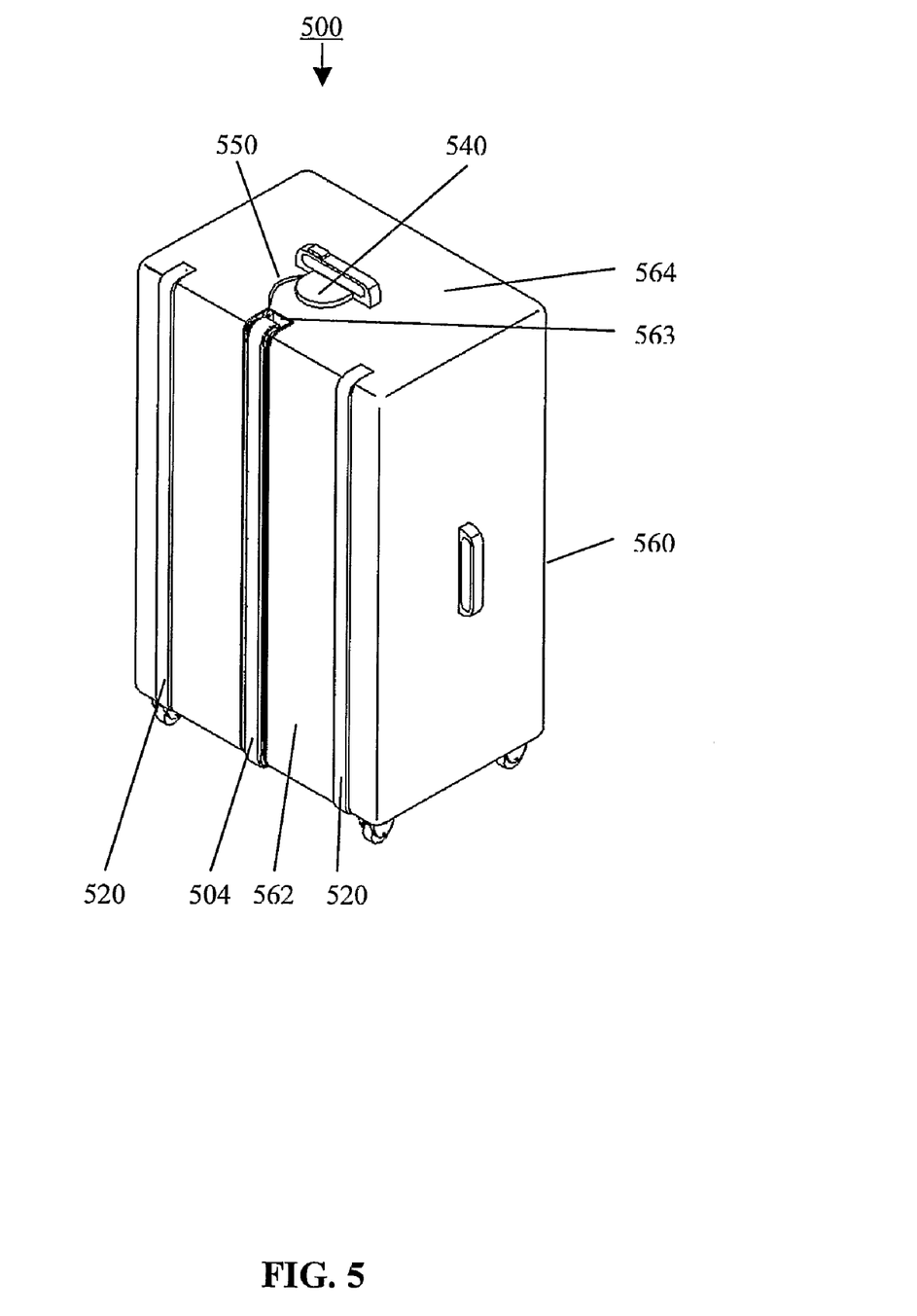
FIG. 5 shows a perspective view of a stair climbing device integrated with a suitcase in accordance with another embodiment of the present invention.

FIG. 5 shows a perspective view of a stair climbing device 500 integrated with a suitcase 560 in accordance with another embodiment of the present invention. The suitcase 560 has a vertical recess 563 on a rear panel 562. The supporting beam 510 is directly moulded onto the surface of the recess 563 to which the climbing module 504 is mounted. The climbing module 504 is configured in a similar manner as the climbing module 104 of the earlier embodiment. The handle 540 is detachably coupled to the top panel 564 of the suitcase 560.

In one embodiment of the suitcase 560, the exterior surface of the rear panel 562 is affixed with a layer of low friction material, such as PTFE. In another embodiment, the low friction material is HDPE. In another embodiment, two beams 520, one at each side of the climbing module 504, are fixed to the rear panel 562 for supporting the suitcase and preventing the direct contact between the suitcase and stairs (not shown in FIG. 5). In yet another embodiment, the surface of the beams 520 in contact with stairs is coated with a layer of low friction material.

Figure 6:
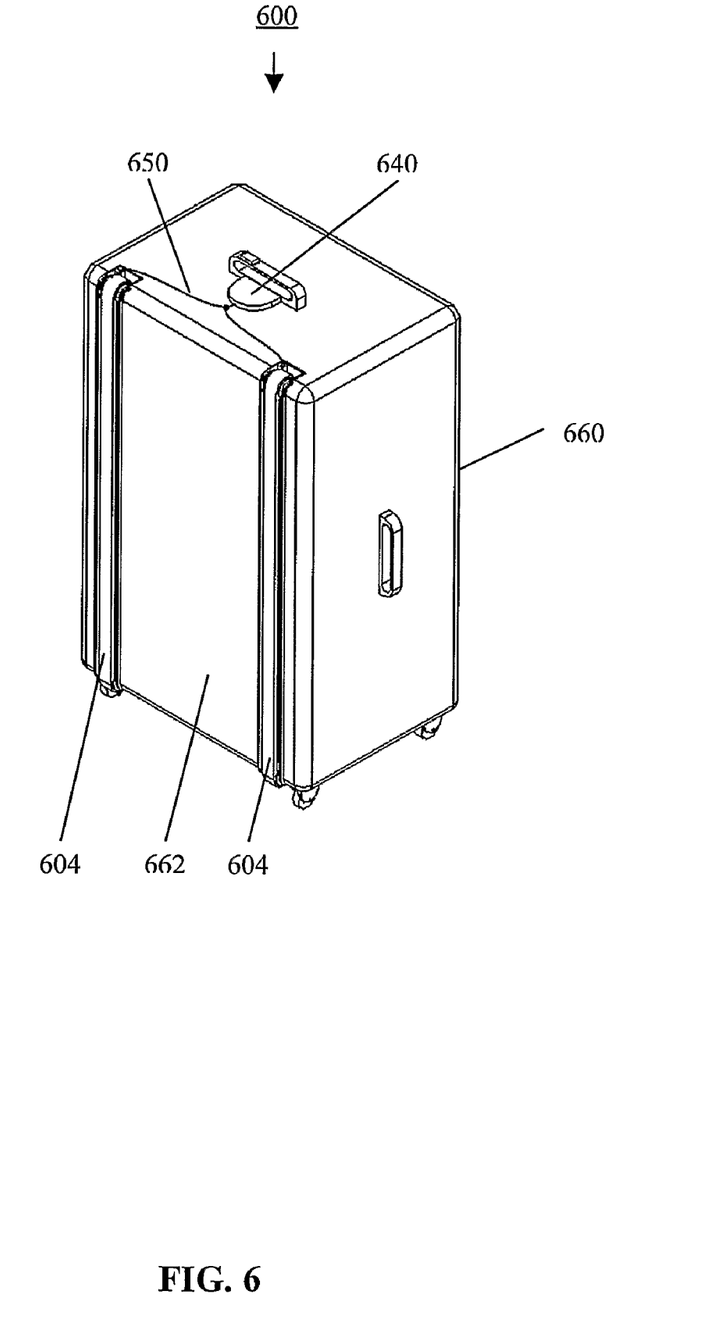
FIG. 6 shows a perspective view of a stair climbing device integrated with a suitcase in accordance with another embodiment of the present invention.

FIG. 6 shows a perspective view of a climbing device 600 integrated with a suitcase 660 in accordance with another embodiment of the present invention. The suitcase 660 comprises two climbing modules 604 that are configured in a similar manner as the climbing modules 104 in earlier embodiment. Each climbing modules 604 is mounted to a supporting beam 610 (not shown in FIG. 6) that is directly moulded on the surface of a vertical recess 663 (not shown in FIG. 6) on a rear panel 662. Two wires 650, each connecting to one of the climbing modules 604, have one end disposed in a same handle 640 to be controlled simultaneously.

Figure 7:
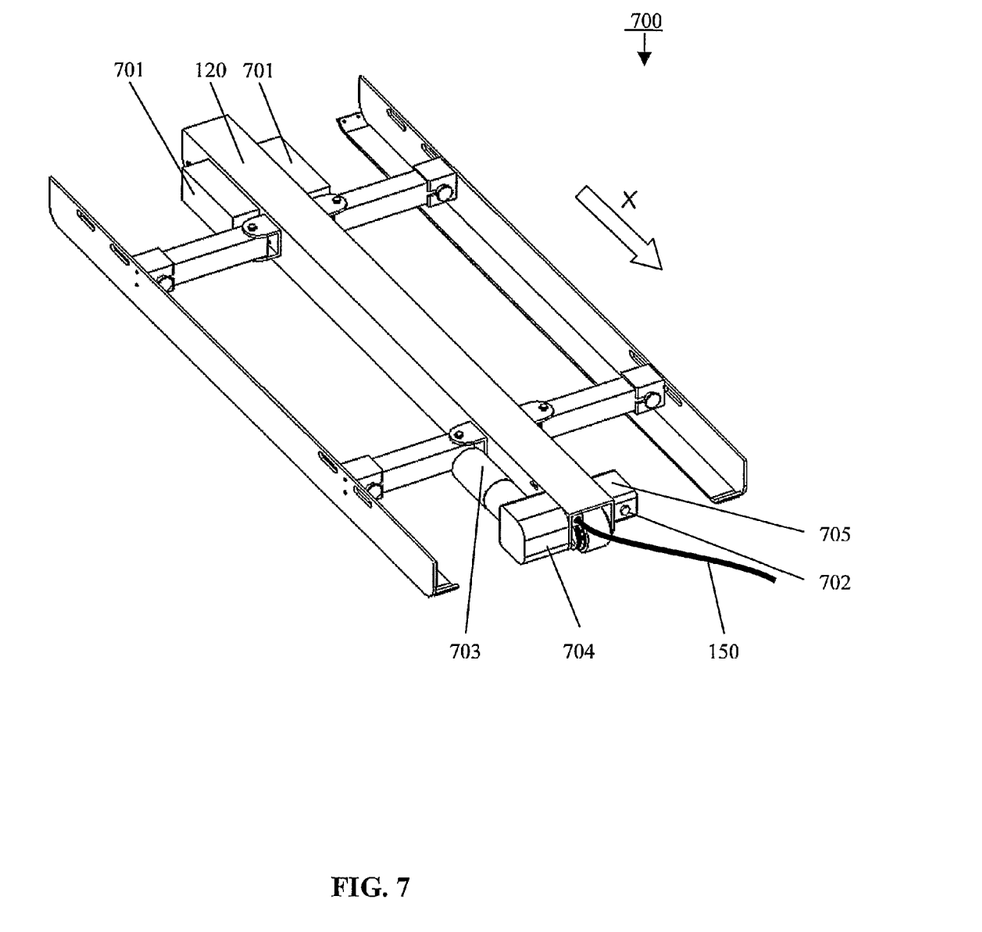
FIG. 7 shows a perspective view of a motor-driven stair climbing device in accordance with yet another embodiment of the present invention.

FIG. 7 shows a perspective view of a motorized stair climbing device 700 in accordance with another embodiment of the present invention. Based on the non-motorized stair climbing device 100 shown in FIG. 1, the motorized stair climbing device 700 further comprises a power unit 701, a motor 703 electronically connected to the power unit 701, a gearbox 704 driven by the motor 703 for rotating the front pulley 160, and a controller 705 for controlling speed and rotation direction of the motor 703. The power unit 701 is manually turned on or off by activating a master switch 702. When the power unit 701 is turned on, the motor 703 is on a standby status, awaiting signals from the controller 705. The controller 705 is connected to the lever 173, responding to a pulling force on the wire 150.

The controller 705 is a Proportional Integral Derivative (PID) controller, comprising a control box, a switch connected to the lever 173, a control timer, a control circuit and an encoder (not shown in FIG. 7 but understood) attached to the motor 703. The control timer records the duration between two neighbouring states of the switch. And the control circuit receives signals from the switch, the timer and the encoder for controlling the motor. The controller 705 implements a speed and direction control on the motor 703 based on the history and rate of the change of switch state sensed by the timer and the encoder. When a pulling force is applied to and maintained on the wire 150, the lever 173 is pivoted away from the resting position, thereby disengaging the pawl 172 from the ratchet wheel 171; the lever 173 also activates the switch to an ON state and the control circuit actuates the motor 703 in a first direction; the motor in turn turns the gearbox 704 and propels the first pulley 160 to rotate in the anti-clockwise direction as seen in FIG. 7; the belt 164 subsequently turns in a direction opposite to the X direction. When a pulling force is exerted on the wire 150, but momentarily released and quickly exerted again, the timer records a short duration between the changes of switch state from ON to OFF and back to ON again. If the recorded duration is within a pre-determined time period, the control circuit sends an output signal to actuate the motor 703 in a second direction reversed from the first direction, and in turn propels the gearbox 704, pulley 160 and belt 164 (shown in FIG. 2A) in a reverse direction. If the duration recorded is longer than the pre-determined time period, there is no change of the output signal and the control circuit actuates the motor 703 in the first direction.

In another embodiment of the controller, the controller 705 is a fuzzy control system. In yet another embodiment of the controller, the controller 705 is an analogue control system. In another further embodiment of the controller, the controller 705 is a digital control system.

When the device is in operation to convey an object on an uneven slope, such as a staircase, the X direction denotes the direction upward the uneven slope.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

The invention claimed is:

1. A device for conveying an object on a surface, the device comprising:
   a support having a open chamber facing the surface;
   a climbing module housed in the chamber, the module comprising:
   a pair of pulleys operable to rotate about parallel axes;
   a belt circumscribing the pair of pulleys and operable to turn in cooperation with the pair of pulleys in a first direction or in a second direction opposite to the first direction;
   a one-way brake for engaging with one of the pulleys and preventing the belt from turning in the first direction but not in the second direction; and
   a wire having a first end and a second end, the first end of the wire being connected to the one-way brake;
   wherein a pulling force on the wire disengages the one-way brake so that the belt is operable to turn in either direction and the device is moveable by the belt on the surface.

2. The device according to claim 1, wherein the pair of pulleys is timing pulleys and the belt is a matching timing belt.

3. The device according to claim 1, wherein an exterior surface of the belt is coated with a rubberized compound to enhance traction with the surface.

4. The device according to claim 1, wherein the climbing module further comprises a support member for preventing the belt from bending inward and maintaining a planar contact interface between the belt and the surface.

5. The device according to claim 4, wherein the support member is coated with a layer of low friction material on the side in contact with the belt, said low friction material is PTFE or HDPE.

6. The device according to claim 4, wherein the support further comprises a plurality of sledge beams connected in a collapsible manner so as to form a flat platform for loading and supporting the object.

7. The device according to claim 6, wherein slots are carved on the plurality of sledge beams for fastening the object to the support by straps.

8. The device according to claim 6, wherein the plurality of sledge beams are coated with a layer of low friction material on the side in contact with the surface so as to reduce sliding friction.

9. The device according to claim 8, wherein the low friction material is PTFE or HDPE.

10. The device according to claim 1, wherein the one-way brake comprises:
    a ratchet wheel secured on the pulley that is engaged by the one-way brake;
    a pawl for engaging with the ratchet wheel in a resting position so as to prevent the belt from turning in the first direction; and
    a biasing means for creating a biasing force to lock the pawl in the resting position when the one-way brake is engaged;
    wherein the one-way brake is disengaged only when the pulling force on the wire overcomes the biasing force and the pawl is moved away from the resting position.

11. The device according to claim 10 wherein the pawl is located at a first arm of a pivotable lever.

12. The device according to claim 11, wherein the lever further comprises a second arm and a third arm, wherein the wire is fixed to the second arm of the lever and the biasing means is attached to the third arm, creating a torque on the lever to lock the pawl in the resting position to engage with the ratchet wheel when the one-way brake is engaged; and wherein the pulling force on the wire creates an opposing torque on the lever to overcome the torque created by the biasing means and the pawl is moved away from the resting position when the one-way brake is disengaged.

13. The device according to claim 12, wherein the biasing means further comprises a screw lockable on the third arm of the lever by a lock nut for stopping the lever from pivoting beyond a pre-determined position away from the resting position under the pulling force on the wire.

14. The device according to one of claim 10, wherein the biasing means is selected from any one of the following:
    a compression spring;
    a tension spring;
    a rubber rod;
    a shock absorber; and
    a stack of disc springs.

15. The device according to claim 1, further comprising a handle connected to the second end of the wire for steering the device in a desired direction, the handle comprising:
    a housing for holding a portion of the wire close to the second end; and
    a release for releasing the wire disposed in the housing so as to adjust the length of the wire outside the housing.

16. The device according to claim 1, wherein the rotation of the pulleys is motorized.

17. The device according to claim 16, further comprising:
    a power unit mounted to the support;
    a motor electronically connected to the power unit;
    a gearbox driven by the motor to rotate one of the pulleys; and a controller connected to the one-way brake for sensing the change of the brake state and sending signals to the motor so as to control the speed and rotation direction of the pulley.

18. The device according to claim 16, wherein the controller is selected from any one of the following:
- a PID controller;
- a fuzzy control system;
- an analogue control system; and
- a digital control system.

19. The device according to claim 1, further comprising a second set of support and climbing module.

20. The device according to claim 1, wherein the device is integrated into a suitcase.

21. The device according to claim 1, wherein the surface is a slope and wherein the device moves down the slope when the belt turns in the first direction; the device moves up the slope when the belt turns in the second direction.

22. The device according to claim 1, wherein the surface is a staircase and the device is configured to engage at least two stair edges at a time.

* * * * *